US012785349B2

(12) United States Patent
Shi et al.

(10) Patent No.: US 12,785,349 B2
(45) Date of Patent: Nov. 3, 2026

(54) 2.8 MICROMETER AND 3.5 MICROMETER DUAL-WAVELENGTH MID-INFRARED FIBER LASER

(71) Applicant: TIANJIN UNIVERSITY, Tianjin (CN)

(72) Inventors: Wei Shi, Tianjin (CN); Lu Zhang, Tianjin (CN); Shijie Fu, Tianjin (CN); Quan Sheng, Tianjin (CN); Junxiang Zhang, Tianjin (CN); Jianquan Yao, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 767 days.

(21) Appl. No.: 18/197,519

(22) Filed: May 15, 2023

(65) Prior Publication Data

US 2024/0275120 A1 Aug. 15, 2024

(30) Foreign Application Priority Data

Feb. 10, 2023 (CN) ........................ 202310098660.7

(51) Int. Cl.
*H01S 3/08* (2023.01)
*H01S 3/067* (2006.01)
*H01S 3/094* (2006.01)
*H01S 3/16* (2006.01)

(52) U.S. Cl.
CPC ........ *H01S 3/0809* (2013.01); *H01S 3/06716* (2013.01); *H01S 3/06733* (2013.01);
(Continued)

(58) Field of Classification Search
CPC .. H01S 3/06716; H01S 3/067; H01S 3/06733; H01S 3/0675; H01S 3/0809;
(Continued)

(56) References Cited

U.S. PATENT DOCUMENTS 5,933,437 A * 8/1999 Delavaux .......... H01S 3/094003 372/6
2007/0297482 A1* 12/2007 Shori ...................... H01S 3/094 372/72
2023/0038367 A1* 2/2023 Wang .................. H01S 3/06716

FOREIGN PATENT DOCUMENTS

CN 110429461 B * 11/2020 ....... H01S 3/094096
WO WO-2011009198 A1 * 1/2011 ........... H01S 3/0675
WO WO-2021137810 A1 * 7/2021 ........... H01S 3/0092

OTHER PUBLICATIONS

Henderson-Sapir et al.; "Recent Advances in 3.5 μm Erbium-Doped Mid-Infrared Fiber Lasers" https://ieeexplore.ieee.org/document/7586117 (Year: 2016) (Year: 2016).*

(Continued)

*Primary Examiner* — Tod T Van Roy
*Assistant Examiner* — Jasmin Kaur Mundi

(57) ABSTRACT

The present disclosure discloses a 2.8 μm and 3.5 μm dual-wavelength mid-infrared fiber laser, which employs "0.98 μm+1.15 μm" pumping scheme, uses a fiber combiner to combine two pump lights into the double cladding Er-doped fluoride fiber. The Er ions in the ground state are first promoted to $^4I_{11/2}$ level by the 0.98 μm pump light, realizing 2.8 μm lasing based on $^4I_{11/2}\rightarrow{}^4I_{13/2}$ transition, and further promoted to $^4F_{9/2}$ level by the 1.15 μm pump light, generating 3.5 μm lasing based on $^4F_{9/2}\rightarrow{}^4I_{9/2}$ transition; followed by the 3.5 μm laser transition, the Er ions would rapidly decay to $^4I_{11/2}$ level via non radiative transition, realizing the re-population of $^4I_{11/2}$ level, effectively enlarge the population inversion of 2.8 μm transition, suppressing the self-termination of 2.8 μm lasing and achieving 2.8 μm and 3.5 μm dual-wavelength cascaded lasing output.

4 Claims, 2 Drawing Sheets

(52) U.S. Cl.
CPC ...... *H01S 3/0675* (2013.01); *H01S 3/094003* (2013.01); *H01S 3/094042* (2013.01); *H01S 3/094053* (2013.01); *H01S 3/094096* (2013.01); *H01S 3/1608* (2013.01); *H01S 3/1618* (2013.01); *H01S 2302/00* (2013.01); *H01S 2303/00* (2013.01)

(58) Field of Classification Search
CPC ......... H01S 3/094003; H01S 3/094042; H01S 3/094053; H01S 3/094096; H01S 3/1608; H01S 3/1618; H01S 2302/00; H01S 2303/00; H01S 3/06704; H01S 3/06708; H01S 3/06712; H01S 3/0672; H01S 3/06725; H01S 3/06729; H01S 3/06737; H01S 3/06741; H01S 3/06745; H01S 3/06754; H01S 3/06758; H01S 3/06762; H01S 3/06766; H01S 3/0677; H01S 3/06765; H01S 3/06779; H01S 3/06783; H01S 3/06787; H01S 3/06791; H01S 3/06795; Y02A 90/10
See application file for complete search history.

(56) References Cited

OTHER PUBLICATIONS

A. S. Kurkov, V. V. Dvoyrin, and A. V. Marakulin, "All-fiber 10 W holmium lasers pumped at λ=1.15 μm," Opt. Lett. 35, 490-492 (2010) (Year: 2010).*
"Longpass Dichroic Mirrors/Beamsplitters", Thorlabs. Products referenced available as of 2012 (1180nm) and 2018 (1500nm). https://www.thorlabs.com/longpass-dichroic-mirrorsbeamsplitters?tabName=Overview#278898 (Year: 2018) (Year: 2018).*
Bharathan, Gayathri, et al. "Optimized laser-written ZBLAN fiber Bragg gratings with high reflectivity and low loss." Optics Letters 44.2 (2019): 423-426. (Year: 2019).*
Henderson-Sapir et al.; "Recent Advances in 3.5 μm Erbium-Doped Mid-Infrared Fiber Lasers" https://ieeexplore.ieee.org/document/7586117 (Year: 2016).*
A. S. Kurkov, V. V. Dvoyrin, and A. V. Marakulin, "All-fiber 10 W holmium lasers pumped at λ=1.15 μm," Opt. Lett. 35, 490-492 (Year: 2010).*

* cited by examiner

2.8 MICROMETER AND 3.5 MICROMETER DUAL-WAVELENGTH MID-INFRARED FIBER LASER

CROSS-REFERENCE TO RELATED APPLICATION

This application claims priority from the Chinese patent application 2023100986607 filed Feb. 10, 2023, the content of which are incorporated herein in the entirety by reference.

TECHNICAL FIELD

The present disclosure belongs to the technical field of fiber laser, especially relates to a 2.8 μm and 3.5 μm dual-wavelength mid-infrared fiber laser.

BACKGROUND

Mid-infrared wavelength region of 2.5-5 μm have received great attention due to the fact that it overlaps with transparent window of the atmosphere and includes abundant molecular absorption lines corresponding to bond resonances such as C—H and O—H. These spectra features allow the mid-infrared laser sources widely used in space communication, infrared countermeasures, high-sensitivity gas detection, and polymer processing. Compared with other laser sources, compact rare-earth-doped fiber laser exhibits the advantages on power scalability, wavelength tunability, thermal management and beam quality, which is taken as a promising approach to obtain high-performance mid-infrared lasing. Hitherto the mid-infrared fiber laser demonstrated by Erbium (Er)-doped fluoride fiber has been rapidly developed in recent years to achieve output power scaling. Er ions can provide two mid-infrared emission peaks in fluoride host, i.e., 2.8 μm and 3.5 μm, corresponding to the $^4I_{1/2}{\rightarrow}^4I_{13/2}$ and $^4F_{9/2}{\rightarrow}^4I_{9/2}$ transitions, respectively. The lasing in these two wavelength regions can be achieved with 0.98 μm single-wavelength pumping scheme and 0.98 μm+1.97 μm dual-wavelength pumping scheme, respectively. Over the past decade, benefited from the development of fluoride fibers and fluoride fiber-based devices, the performance of mid-infrared Er-doped fluoride fiber lasers have been promoted significantly. Hitherto the maximum output powers of 2.8 μm and 3.5 μm single-wavelength Er-doped fluoride fiber lasers reach up to 40 W and 15 W, respectively. In view of the fact that the two transitions mentioned above are independent and have no overlap on start and terminate energy levels, cascaded lasing with dual-wavelength mid-infrared output can be expected by constructing two separate resonators with single piece of Er-doped fluoride fiber.

However, the existing pumping scheme cannot achieve efficient inversion of the particles in 3.5 μm transition and 2.8 μm transitions simultaneously, that's why previous studies are focusing on a single wavelength. Although the final levels of 0.98 μm and 1.97 μm pump absorption respectively correspond to the upper levels of 2.8 μm and 3.5 μm pump absorption, 0.98 μm+1.97 μm dual-wavelength pumping scheme seems feasible since it covers both of the 2.8 μm and 3.5 μm transitions. However, due to that the virtual ground state of 1.97 μm absorption and the upper level of 2.8 μm laser share the same level ($^4I_{11/2}$), the absorption of 1.97 μm pump ($^4I_{11/2}{\rightarrow}^4F_{9/2}$) depletes the population in $^4I_{11/2}$ level and thus reduces the gain of 2.8 μm transition. This behavior would induce the 2.8 μm laser efficiency even lower than that achieved with the 1.97 μm single-wavelength pumping scheme. Hence, the "0.98 μm+1.97 μm" dual-wavelength pumping scheme is actually paradoxical for 3.5 μm and 2.8 μm dual-wavelength generation and not applicable to realize efficient cascaded mid-infrared lasing in Er-doped fluoride fiber laser. Furthermore, in the conventional 0.98 μm pumped 2.8 μm single-wavelength mid-infrared fiber lasers, a large amount of Er ions would accumulate in the long-lived $^4I_{13/2}$ level (~9.9 ms). Such behavior would reduce the inversion population and induce the self-termination of lasing, which limits the power scaling of 2.8 μm laser.

REFERENCES

[1] Y. O. Aydin, V. Fortin, R. Vallée, and M. Bernier, "Towards power scaling of 2.8 □m fiber lasers," Opt. Lett. 43(18), 4542-4545 (2018).

[2]M. Lemieux-Tanguay, V. Fortin, T. Boilard, P. Paradis, F. Maes, L. Talbot, R. Vallée, and M. Bernier, "15 W monolithic fiber laser at 3.55 μm," Opt. Lett. 47(2), 289-292 (2022).

SUMMARY

The present disclosure discloses a 2.8 μm and 3.5 μm dual-wavelength mid-infrared fiber laser, which adopts dual-wavelength pumping scheme of performing ground state absorption at 0.98 μm and excited state absorption at 1.15 μm to simultaneously achieve 2.8 μm and 3.5 μm lasing in single piece of double cladding Er-doped fluoride fiber based on two cascaded transitions, the present disclosure can well address the self-termination of 2.8 μm lasing resulted from the long lifetime, effectively scaling the operating wavelength and improving the efficiency of mid-infrared fiber laser sources. The details are as follows.

A dual-wavelength mid-infrared fiber laser, comprising a first pump source, a second pump source, a fiber combiner, a first fiber Bragg grating, a second fiber Bragg grating, a double cladding Er-doped fluoride fiber and a long pass filter.

The first pump source is multimode laser diode with output wavelength of 0.98 μm, the second pump source is single-transverse-mode Ytterbium (Yb)-doped fiber laser with output wavelength of 1.15 μm, the input port of the fiber combiner includes a single-mode fiber and a multimode fiber, and the output fiber is a double cladding fiber which is capable of propagating 1.15 μm single-mode pump laser inside the core and propagating 0.98 μm multimode pump laser inside the inner cladding.

The central wavelength of the first fiber Bragg grating is a certain wavelength within the emission band of Er ion $^4F_{9/2}{\rightarrow}^4I_{9/2}$ transition, the reflectivity of the first fiber Bragg grating is greater than 99.5%, the FWHM is narrower than 5 nm and the insertion loss at pump wavelengths is lower than 0.5 dB; the central wavelength of the second fiber Bragg grating is a certain wavelength within the emission band of Er ion $^4I_{1/2}{\rightarrow}^4I_{13/2}$ transition, the reflectivity of the second fiber Bragg grating is greater than 99.5%, the FWHM is narrower than 5 nm and the insertion loss at pump wavelengths is lower than 0.5 dB; the long pass filter has a cutoff wavelength of 1.5 μm, the reflectivity at 0.98 μm and 1.15 μm are greater than 95%, as well as transmission at both of the 2.8 μm and 3.5 μm are greater than 95%.

Output end of the double cladding Er-doped fluoride fiber is perpendicularly cleaved, which can provide a 4% Fresnel reflectivity of the full band for both of the 2.8 μm and 3.5 μm laser, thus, the cleaved output end and the first fiber Bragg grating form a 3.5 μm resonator, while the cleaved output end and the second fiber Bragg grating form a 2.8 μm resonator.

0.98 μm and 1.15 μm pump light launched by the first pump source and the second pump source are combined by the fiber combiner and injected into the double cladding Er-doped fluoride fiber through the first fiber Bragg grating and the second fiber Bragg grating. As shown in FIG. 1, the absorption of 0.98 μm pump light is ground state absorption (GSA), corresponding to $^4I_{15/2}\rightarrow{}^4I_{11/2}$ transition, the absorption of 1.15 μm pump light is excited state absorption (ESA), corresponding to $^4I_{13/2}\rightarrow{}^4F_{9/2}$ transition. The Er ions in the ground state are first promoted to $^4I_{11/2}$ level by the 0.98 μm pump light, realizing the first population inversion of 2.8 μm transition and achieving 2.8 μm laser oscillation after reaching threshold. The long lifetime of $^4I_{13/2}$ level would result in a large amount of Er ions accumulated in this level, which will be further promoted to $^4F_{9/2}$ level by the pumping of the second pump source. On one hand, this process can realize the population inversion of 3.5 μm transition, generating 3.5 μm lasing in the 3.5 μm resonator as the gain is over the loss. On the other hand, the 1.15 μm ESA can effectively depopulate the $^4I_{13/2}$ level. Followed by the 3.5 μm laser transition, the Er ions would rapidly decay to $^4I_{11/2}$ level via non radiative transition, realizing the re-population of $^4I_{11/2}$ level. This behavior will effectively enlarge the population inversion of 2.8 μm transition, suppressing the self-termination of 2.8 μm lasing and achieving 2.8 μm and 3.5 μm dual-wavelength cascaded lasing output. Since the 0.98 μm and 1.15 μm pump lights cannot be completely absorbed, the long pass filter is placed after the output port of the double cladding Er-doped fiber to remove the residual pump light.

Further, the second pump source can be a continuous-wave laser or a pulsed laser.

The beneficial effects of the technical scheme according to the present disclosure are:

1. The self-termination resulted from the long lifetime of $^4I_{13/2}$ level is the main limitation for 2.8 μm power and efficiency scaling. This disclosure proposes a novel "0.98 μm+1.15 μm" pumping scheme, in which the 1.15 μm pump is used to de-populate the ions accumulation in $^4I_{13/2}$ level. Furthermore, the Er ions promoted to higher excited states would return to $^4I_{11/2}$ level via nonradiative transition. The combination of these two processes enlarges the population inversion of 2.8 μm transition, which would significantly improve the 2.8 μm laser efficiency.
2. Apart from improving the efficiency of 2.8 μm laser, the 1.15 μm pump can also provide gain for 3.5 μm transition. Therefore, this disclosure allows efficient 2.8 μm and 3.5 μm dual-wavelength operation only based on single piece of Er-doped fluoride fiber. This method not only enriches the laser wavelength, but also realizes a high compactness of laser system.

In which:

1: first pump source;
2: second pump source;
3: fiber combiner;
3-1: single-mode fiber input port;
3-2: multimode fiber input port;
3-3: output port;
4: first fiber Bragg grating;
5: second fiber Bragg grating;
6: double cladding Er-doped fluoride fiber
7: long pass filter.

DETAILED DESCRIPTION OF THE PRESENT DISCLOSURE

To make the objectives, technical solutions, beneficial effects of the present disclosure clearer, the technical solutions in the embodiments of the present disclosure will be clearly and completely described below with reference to the drawings provided in the embodiments of the present disclosure.

Embodiment 1

Figure 1:
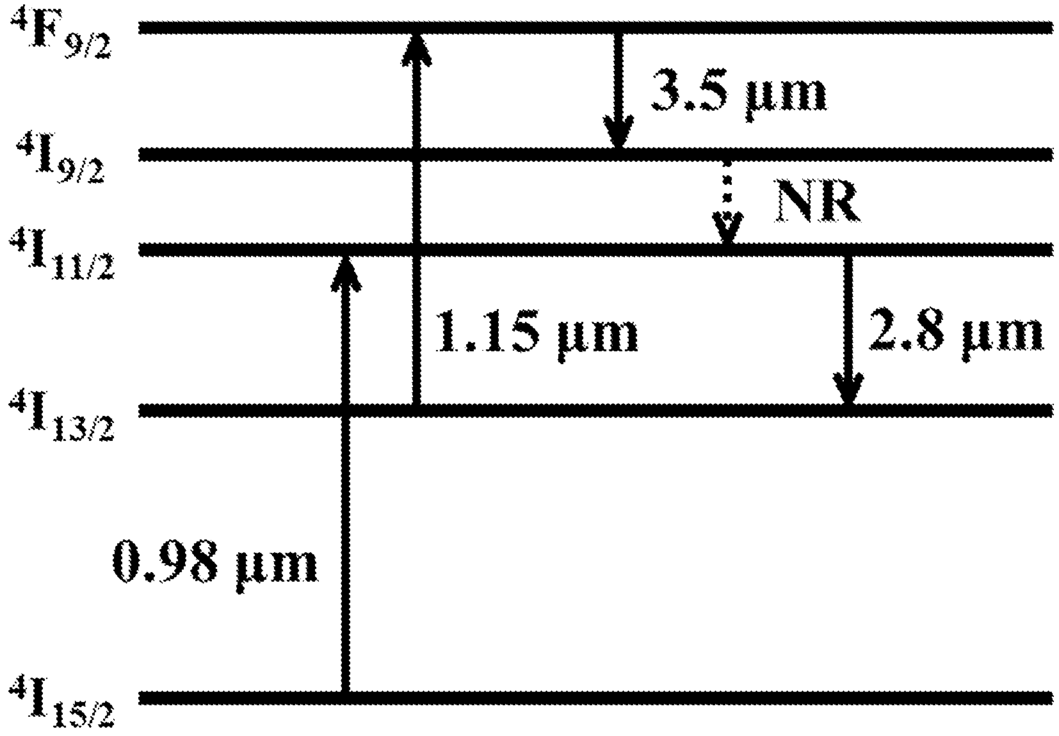
FIG. 1 shows the energy level of Er ions in fluoride glass host and the important transitions involved in this disclosure.
Figure 2:
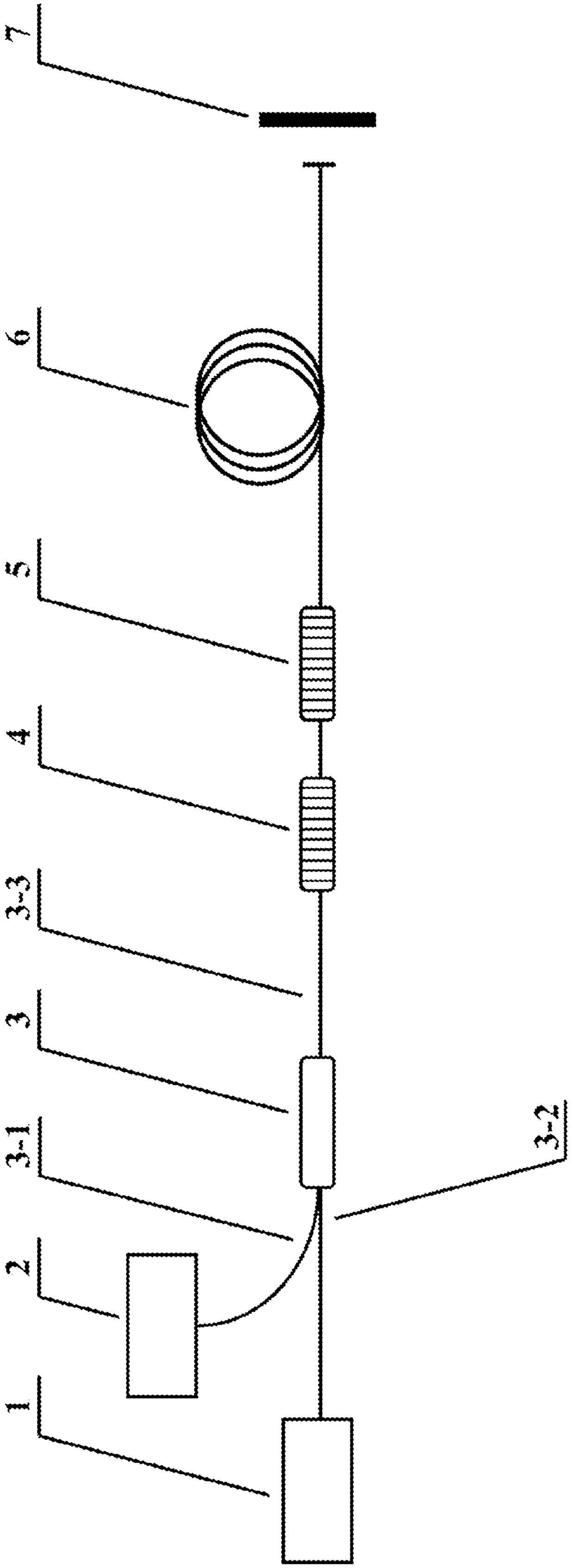
FIG. 2 is a schematic of the 2.8 μm and 3.5 μm dual-wavelength mid-infrared fiber laser.

A 2.8 μm and 3.5 μm dual-wavelength mid-infrared fiber laser, as shown in FIG. 2, including: a first pump source 1, a second pump source 2, a fiber combiner 3, a first fiber Bragg grating 4, a second fiber Bragg grating 5, a double cladding Er-doped fluoride fiber 6 and a long pass filter 7.

Wherein, the first pump source 1 is a 976 nm wavelength multimode laser diode providing a maximum output power of 10 W, an output fiber thereof is connected with the multimode fiber input port 3-2 of the fiber combiner 3; the second pump source 2 is a 1150 nm wavelength single-transverse-mode Yb-doped fiber laser providing a maximum output power of 50 W, an output fiber thereof is connected with the single-mode fiber input port 3-1 of the fiber combiner 3.

Wherein, the central wavelength of the first fiber Bragg grating 4 is 3540 nm, at which the first fiber Bragg grating 4 provides a reflectivity >99.9% and FWHM of 2 nm, and the insertion loss is 0.2 dB; the central wavelength of the second fiber Bragg grating 5 is 2820 nm, at which the second fiber Bragg grating 5 provides a reflectivity >99.9% and FWHM of 2 nm, and the insertion loss is 0.2 dB. The insertion loss of both the first fiber Bragg grating 4 and the second fiber Bragg grating 5 at 976 nm and 1150 nm are lower than 0.3 dB. Wherein, the double cladding Er-doped fluoride fiber 6 is non polarization maintaining fiber. It has a core and inner cladding diameters of 15 μm and 250 μm, respectively, the core numerical aperture, doping concentration, and length of the fiber are 0.125, 1 mol. %, and 10 m, respectively. Wherein, the long pass filter 7 has a cutoff wavelength of 1.5 μm, it provides a greater than 95% reflectivity at 976 nm and 1150 nm as well as a greater than 95% transmission both at 2820 nm and 3540 nm.

In practice, 976 nm and 1150 nm pump lights are first combined by the fiber combiner 3 and then injected into the double cladding Er-doped fluoride fiber 6, where the 976 nm and 1150 nm pump lights propagate in the inner cladding and core, respectively. The Er ions in the ground state are first promoted to $^4I_{11/2}$ level by the 976 nm pump light, realizing the first population inversion of $^4I_{11/2}$ level. After a 976 nm pump power exceeds the 2.8 μm laser threshold, the 2820 nm lasing can be generated in the laser resonator formed between the second fiber Bragg grating 5 and the output end facet of the double cladding Er-doped fluoride fiber 6. Followed by the 2820 nm laser transition, the Er ions would transit to $^4I_{13/2}$ level and accumulate gradually in this level. These Er ions would be further promoted to $^4F_{9/2}$ level by the 1150 nm pump light, de-populating the $^4I_{13/2}$ level and realizing the population inversion of 3.5 μm transition.

After a 1150 nm pump power exceeds the 3.5 μm laser threshold, the 3540 nm lasing can be generated in the laser resonator formed between the first fiber Bragg grating 4 and the output end facet of the double cladding Er-doped fluoride fiber 6. Followed by the 3540 nm laser transition, the Er ions would rapidly decay to $^4I_{11/2}$ level via non radiative transition, realizing the re-population of $^4I_{11/2}$ level and enhancing the 2.8 μm laser gain. Such multi population behavior can effectively suppress the self-termination of 2.8 μm laser, enabling efficient 2.8 μm and 3.5 μm dual-wavelength operation based on a single piece of double cladding Er-doped fluoride fiber.

In the fiber laser of the present disclosure, at 976 nm pump power of 10 W and 1150 nm pump power of 50 W, the 2820 nm and 3540 nm output power can reach up to 20 W and 10 W, respectively.

Embodiment 2

In the embodiment of the present disclosure, the second pump source can be an Yb-doped silica fiber laser or a Raman fiber laser, as long as it can provide sufficient output power at 1150 nm, the type of second pump source is not limited.

In the embodiment of the present disclosure, the model of each device is not limited except for special instructions.

Those skilled in the art must understand that the accompanying drawings are only schematic diagrams of a preferred embodiment, and the serial numbers of the above-mentioned embodiments of the present disclosure are only for description, and do not represent the superiority or inferiority of the embodiments.

The foregoing embodiments and specific examples are merely for describing the technical solutions of the present disclosure and not intended to limit the present disclosure. Although the present disclosure has been described in details by the foregoing embodiments, it should be understood by a person of ordinary skill in the art that modifications may be made to the technical solutions recorded in the foregoing embodiments or equivalent replacements may be made to some or all of the technical features, and these modifications or replacements shall not make the essence of the corresponding technical solutions depart from the scope of the technical solutions of the embodiments of the present disclosure. Non-essential improvements and adjustments or replacements made according to the content of this specification by those skilled in the art shall fall into the protection scope of the present disclosure.

What is claimed is:

1. A 2.8 μm and 3.5 μm dual-wavelength mid-infrared fiber laser, comprising a first pump source, a second pump source, a fiber combiner, a first fiber Bragg grating, a second fiber Bragg grating, a double cladding Er-doped fluoride fiber and a long pass filter;

an output end of the double cladding Er-doped fluoride fiber is perpendicularly cleaved, the cleaved output end and the first fiber Bragg grating forms a 3.5 μm resonator, the cleaved output end and the second fiber Bragg grating form a 2.8 μm resonator;

the first pump source and the second pump source correspond to a ground state absorption with an Er ion $^4I_{15/2} \rightarrow {}^4I_{1/2}$ transition and an excited state absorption with an Er ion $^4I_{13/2} \rightarrow {}^4F_{9/2}$ transition, respectively, pump lights generated by the first pump source and the second pump source are combined by the fiber combiner and then injected into the double cladding Er-doped fluoride fiber to provide gain for both 2.8 μm and 3.5 μm transitions, as well as to suppress the self-termination of 2.8 μm laser caused by long level lifetime, enabling 2.8 μm and 3.5 μm dual-wavelength transmission simultaneously based on a single piece of double cladding Er-doped fluoride fiber;

wherein the first pump source is a multimode laser with an output wavelength of 0.98 μm; wherein the second pump source is a single-transverse-mode Yb-doped fiber laser with an output wavelength of 1.15 μm; wherein an input port of the fiber combiner includes a single-mode fiber and a multimode fiber, and an output fiber is a double cladding fiber which is capable of propagating 1.15 μm single-mode pump laser inside the core and propagating 0.98 μm multimode pump laser inside an inner cladding.

2. The 2.8 μm and 3.5 μm dual-wavelength mid-infrared fiber laser according to claim 1, wherein a central wavelength of the first fiber Bragg grating is any wavelength within the emission band of Er ion $^4F_{9/2} \rightarrow {}^4I_{9/2}$ transition, the reflectivity of the first fiber Bragg grating is greater than 99.5%, the FWHM is narrower than 5 nm and the insertion loss at pump wavelengths is lower than 0.5 dB.

3. The 2.8 μm and 3.5 μm dual-wavelength mid-infrared fiber laser according to claim 1, wherein a central wavelength of the second fiber Bragg grating is any wavelength within the emission band of Er ion $^4I_{11/2} \rightarrow {}^4I_{13/2}$ transition, the reflectivity of the second fiber Bragg grating is greater than 99.5%, the FWHM is narrower than 5 nm and the insertion loss at pump wavelengths is lower than 0.5 dB.

4. The 2.8 μm and 3.5 μm dual-wavelength mid-infrared fiber laser according to claim 1, wherein the long pass filter has a cutoff wavelength of 1.5 μm, a reflectivity at 0.98 μm and 1.15 μm are greater than 95%, and a transmission at both of the 2.8 μm and 3.5 μm are greater than 95%.

* * * * *